United States Patent Office 3,413,264
Patented Nov. 26, 1968

3,413,264
POLYMERIC STANNOIC ACID PRODUCTS
Ingenuin Hechenbleikner, Kenwood, Raymond S. Dalter, Cincinnati, and John F. Hussar, Loveland, Ohio, assignors to Carlisle Chemical Works, Inc., Reading, Ohio, a corporation of Ohio
No Drawing. Continuation-in-part of application Ser. No. 427,487, July 22, 1965. This application July 13, 1965, Ser. No. 471,718
13 Claims. (Cl. 260—45.75)

ABSTRACT OF THE DISCLOSURE

A halogen containing resin selected from the group consisting of vinyl chloride homopolymers, vinyl chloride copolymers, vinylidene chloride homopolymers, vinylidene chloride copolymers, polyvinyl bromide, polyvinyl fluoride and chlorinated polyethylene containing a stabilizingly effective amount of the condensation product of 1 mole of monohydrocarbyl stannoic acid with (a) 1 or (b) 2 or 2.5 moles of a compound having a formula selected from the group consisting of $$HOOC-(\overset{R_5}{\underset{|}{C}H})_q-OH;\ HS-(CH_2)-COOR_1;\ HOOCR_4$$
$$HOOC-(CH_2)_m-COOR_1$$

and $$HOOC-CH=CHCOOR_1$$

wherein $R_5$ is hydrogen or methyl, $R_1$ is hydrocarbyl, $R_4$ is hydrogen or hydrocarbyl, $m$ is 0 or a positive integer and $q$ is an integer of at least 1.

---

This application is a continuation-in-part of application of Ser. No. 427,487 filed Jan. 22, 1965.

This invention relates to novel polymeric stannoic acid derivatives.

It is an object of the present invention to prepare novel polymeric stannoic acid derivatives.

Another object is to stabilize halogen containing vinyl resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds having one of the formulae

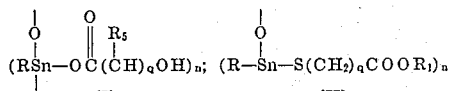

[I]       [II]

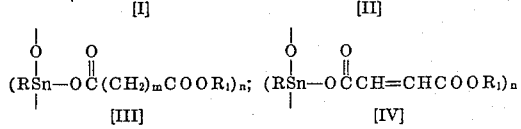

[III]     [IV]

or a compound which may have the formula

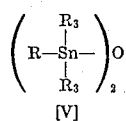

[V]

where R, and $R_1$ are alkyl, aryl, aralkyl, alkenyl or alicyclic, $R_3$ is

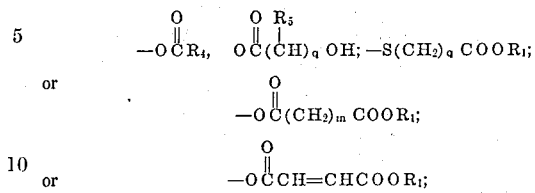

$n$ is an integer of at least 2 and can be 20 or more;
$m$ is zero or a positive integer, usually not over 10;
$R_4$ is hydrogen or hydrocarbyl, e.g. alkyl, alkenyl or phenyl;
$R_5$ is hydrogen or methyl; and
$q$ is an integer of at least 1.

The compounds of Formulae 1, 2, 3, and 4 are prepared by the condensation reaction of a hydrocarbyl stannoic acid with an equimolar amount of hydroxycarboxylic acid, a hydrocarbyl mercaptoalkanoate, or a hydrocarbyl half ester of an alkanedioic acid or of an alkenedioic acid. Water is split out as by product in the polymerization reaction and is removed, preferably by azeotropic distillation, e.g. using a hydrocarbon such as benzene, toluene, xylene, hexane, heptane, octane or petroleum ether as the azeotroping agent.

The compounds which may have Formula 5 are formed in similar fashion by reacting 1 mole of the hydrocarbyl stannoic acid with 2 moles of a monocarboxylic acid, a hydroxycarboxylic acid, a hydrocarbyl mercaptoalkanoate, or a hydrocarbyl half ester of an alkanedioic acid or an alkenedioic acid. Desirably a slight excess over the 2 moles of the carboxyl or mercapto group containing reactant is employed, e.g. up to 2.5 moles of such reactant per mole of stannoic acid.

As starting stannoic acids there can be used methyl stannoic acid, propyl stannoic acid, butyl stannoic acid, isobutyl stannoic acid, octyl stannoic acid, dodecyl stannoic acid, 2-ethylhexyl stannoic acid, allyl stannoic acid, vinyl stannoic acid, cyclohexyl stannoic acid, cyclopentyl stannoic acid, phenyl stannoic acid, o-tolyl stannoic acid, m-tolyl stannoic acid, p-tolyl stannoic acid, p-butylphenyl stannoic acid, benzyl stannoic acid, octadecyl stannoic acid and oleyl stannoic acid.

As hydrocarboxylic acids there can be used glycolic acid, lactic acid, β-hydroxypropionic, and γ-hydroxybutyric acid.

As hydrocarbyl mercaptoalkanoates there can be employed isooctyl mercaptoacetate, octyl mercaptoacetate, isooctyl β-mercaptopropionate, methyl mercaptoacetate, ethyl mercaptoacetate, butyl mercaptoacetate, hexyl mercaptoacetate, decyl mercaptoacetate, dodecyl mercaptoacetate, octadecyl mercaptoacetate, oleyl mercaptoacetate, allyl mercaptoacetate, benzyl mercaptoacetate, cyclohexyl mercaptoacetate, phenyl mercaptoacetate, p-tolyl mercaptoacetate, o-tolyl mercaptoacetate, m-tolyl mercaptoacetate, p-butylphenyl mercaptoacetate, cyclopentyl mercaptoacetate, 2-ethylhexyl mercaptoacetate, butyl β-mercaptopropionate, phenyl β-mercaptoproprionate, allyl β-mercaptopropionate, dodecyl β-mercaptopropionate, cyclophenyl β-mercaptopropionate, benzyl β-mercaptopropionate, octyl β-mercaptopropionate, methyl β-mercaptopropionate, ethyl β-mercaptopropionate, hexyl β-mercaptopropionate, isodecyl β-mercaptopropionate, octadecyl β-mercaptopropionate, oleyl β-mercaptopropionate p-tolyl β-mercaptopropionate, o-tolyl β-mercaptopropionate, p-butylphenyl β-mercaptopropionate 2-ethylhexyl β-mercaptopropionate and octyl γ-mercaptobutylrate.

As hydrocarbyl half esters of alkane or alkene dioic acids there can be used mono octyl oxalate, mono butyl malonate, mono methyl succinate, mono butyl maleate, mono ethyl fumarate, mono butyl glutarate, mono propyl adipate, mono isooctyl succinate, mono methyl sebacate, mono phenyl succinate, mono benzyl malonate, mono cyclohexyl adipate, mono octadecyl azelate, mono allyl succinate, mono oleyl glutarate.

As monocarboxylic acids there can be used acetic acid, propionic acid, butyric acid, valeric acid, decanoic acid, palmitic acid, stearic acid, oleic acid, acrylic acid, benzoic acid, o-toluic acid, p-toluic acid, m-toluic acid and cyclohexane carboxylic acid.

Illustrative of compounds of the present invention within Formula 1 made by the use of equimolar amounts of the stannoic acid and hydroxy carboxylic acids are the condensation product of butyl stannoic acid with either glycolic acid or lactic acid or β-hydroxypropionic acid or γ-hydroxybutyric acid. The condensation product of octyl stannoic acid with glycolic acid or lactic acid or β-hydroxypropionic acid, the condensation product of dodecyl stannoic acid with glycolic acid, the condensation product of dodecyl stannoic acid with glycolic acid, the condensation product of methyl stannoic acid with lactic acid, the condensation product of phenyl stannoic acid with glycolic acid, the condensation product of allyl stannoic acid with β-hydroxypropionic acid, the condensation product of benzyl stannoic acid with glycolic acid, the condensation product of cyclohexyl stannoic acid with lactic acid.

Illustrative of compounds of the present invention within Formula 2 made by the use of equimolar amounts of the stannoic acid and hydrocarbyl mercaptoalkanoates are the condensation products of butyl stannoic acid with isooctyl mercaptoacetate or octyl mercaptoacetate or isooctyl β-mercaptopropionate, or methyl mercaptoacetate, or ethyl mercaptoacetate, or butyl mercaptoacetate, or hexyl mercaptoacetate, or decyl mercaptoacetate, or dodecyl mercaptoacetate, or octadecyl mercaptoacetate, or oleyl mercaptoacetate, or allyl mercaptoacetate, or benzyl mercaptoacetate, or cyclohexyl mercaptoacetate, or phenyl mercaptoacetate, or p-tolyl mercaptoacetate, or o-tolyl mercaptoacetate, or m-tolyl mercaptoacetate, or p-butylphenyl mercaptoacetate, or 2-ethylhexyl mercaptoacetate, or butyl β-mercaptopropionate, or phenyl β-mercaptopropionate or allyl β-mercaptopropionate, or dodecyl β-mercaptopropionate, or benzyl β-mercaptopropionate, or octyl γ-mercaptobutyrate; the condensation products of methyl stannoic acid with isooctyl mercaptoacetate, or octyl β-mercaptopropionate; the condensation products of octyl stannoic acid with isooctyl mercaptoacetate, or isooctyl β-mercaptopropionate, or methyl mercaptoacetate, or isodecyl mercaptoacetate, or benzyl β-mercaptopropionate, or phenyl mercaptoacetate, or cyclohexyl β-mercaptopropionate, or oleyl mercaptoacetate; or hexyl β-mercaptopropionate, or methyl β-mercaptopropionate, or ethyl β-mercaptopropionate, or isodecyl β-mercaptopropionate or octadecyl β-mercaptopropionate, or oleyl β-mercaptopropionate, or p-tolyl β-mercaptopropionate, or o-tolyl β-mercaptopropionate, or p-butylphenyl β-mercaptopropionate, or 2-ethylhexyl β-mercaptopropionate; the condensation products of isobutyl stannoic acid with propyl mercaptoacetate, or amyl β-mercaptopropionate, the condensation products of 2-ethyl hexyl stannoic acid with heptyl mercaptoacetate or p-tolyl β-mercaptopropionate; the condensation product of allyl stannoic acid with isooctyl mercaptoacetate; the condensation product of oleyl stannoic acid with propyl β-mercaptopropionate; the condensation products of cyclohexyl stannoic acid with nonyl mercaptoacetate or isooctyl β-mercaptopropionate; the condensation products of phenyl stannoic acid with butyl mercaptoacetate, or decyl β-mercaptopropionate, or phenyl mercaptoacetate; or phenyl β-mercaptopropionate; the condensation product of benzyl stannoic acid with hexyl mercaptoacetate or isooctyl β-mercaptopropionate; the condensation product of octadecyl stannoic acid with ethyl mercaptoacetate or butyl β-mercaptopropionate.

Illustrative of compounds of the present invention within Formulae 3 and 4 made by the use of equimolar amounts of the stannoic acid and half esters of dicarboxylic acids are the condensation products of butyl stannoic acids with mono octyl oxalate, or mono butyl malonate, or mono methyl succinate, or mono butyl maleate, or mono ethyl fumarate, or mono butyl glutarate, or mono propyl adipate, or mono isooctyl succinate, or mono methyl sebacate, or mono phenyl succinate, or mono benzyl malonate, or mono cyclohexyl adipate, or mono octadecyl azelate, or mono allyl succinate, or mono oleyl glutarate; the condensation products of methyl stannoic acid with mono octyl oxalate, or mono butyl malonate, or mono methyl succinate, or mono ethyl maleate, or mono isooctyl adipate; the condensation products of octyl stannoic acid with mono amyl oxalate, or mono hexyl malonate, or mono butyl succinate, or mono octyl maleate, or mono isobutyl fumarate, or mono phenyl adipate, or mono cyclohexyl sebacate; the condensation products of isobutyl stannoic acid with mono heptyl succinate or mono benzyl pimelate; the condensation products of 2-ethylhexyl stannoic acid with mono butyl malonate, or mono p-tolyl succinate; the condensation product of oleyl stannoic acid with mono hexyl adipate; the condensation products of cyclohexyl stannoic acid with mono amyl adipate, or mono methyl succinate, or mono phenyl glutarate; the condensation products of phenyl stannoic acid with mono phenyl malonate, or mono ethyl fumarate, or mono butyl maleate, or mono octyl succinate; the condensation product of benzyl stannoic acid with mono butyl succinate; the condensation product of octadecyl stannoic acid with mono octyl malonate.

Illustrative of compounds of the present invention which may have Formula 5 and are made by reacting 1 mole of the stannoic acid with 2 moles of a mono carboxylic acid, a hydroxycarboxylic acid, a hydrocarbyl mercaptoalkanoate, or a hydrocarbyl half ester of an alkane or alkene dioic acid are the reaction product of 1 mole of butyl stannoic acid with 2 moles or α-hydroxy propionic acid; the reaction product of 1 mole of butyl stannoic acid with 2 moles of β-hydroxypropionic acid; the reaction product of 1 mole of butyl stannoic acid with 2 moles or gamma-hydroxybutyric acid; the reaction product of 1 mole of octyl stannoic acid with 2 moles of hydroxyacetic acid; the reaction product of 1 mole of octyl stannoic acid with 2 moles of α-hydroxpropionic acid; the reaction product of 1 mole of octyl stannoic acid with 2 moles of gamma-hydroxybutyric acid; the reaction product of 1 mole of dodecyl stannoic acid with 2 moles of hydroxyacetic acid; the reaction product of 1 mole of methyl stannoic acid with 2 moles of α-hyroxypropionic acid; the reaction product of 1 mole of phenyl stannoic acid with 2 moles of hydroxyacetic acid; the reaction product of allyl stannoic acid with 2 moles of β-hydroxypropionic acid; the reaction product of 1 mole of benzyl stannoic acid with 2 moles of hydroxyacetic acid; the reaction product of 1 mole of cyclohexyl stannoic acid with 2 moles of α-hydroxypropionic acid; the reaction product of 1 mole of butyl stannoic acid with 2 moles of isooctyl mercaptoacetate; the reaction product of 1 mole of butyl stannoic acid with 2 moles of isooctyl β-mercapto propionate; the reaction product of 1 mole of butyl stannoic acid with 2 moles of methyl mercaptoacetate; the reaction product of 1 mole of butyl stannoic acid with 2 moles of ethyl mercaptoacetate; the reaction product of 1 mole of butyl stannoic acid with 2 moles of butyl mercaptoacetate; the reaction product of 1 mole of butyl stannoic acid with 2 moles of hexyl mercaptoacetate; the reaction product of 1 mole of butyl stannoic acid with 2 moles of decyl mercaptoacetate; the reaction product of 1 mole butyl stannoic acid with 2 moles of dodecyl mercaptoacetate; the reaction product of 1 mole of butyl stannoic acid with 2 moles of octadecyl mercaptoacetate; the reaction product of 1 mole of butyl stannoic acid with 2 moles of oleyl mercaptoacetate; the reaction product of 1 mole of butyl stannoic acid with 2 moles of allyl mercaptoacetate; the reaction product of 1 mole of butyl stannoic acid with 2 moles of benzyl mercaptoacetate; the reaction product of 1 mole of butyl stannoic acid with 2 moles of cyclohexyl mercaptoacetate; the reaction product of 1 mole of butyl stannoic acid with 2 moles of phenyl mercaptoacetate; the reaction product of one mole of butyl stannoic acide with 2 moles of p-tolyl mercaptoacetate; the reaction product of 1 mole of butyl stannoic acid with 2 moles of o-tolyl mercaptoacetate; the reaction product of 1 mole of butyl stannoic acid with 2 moles of m-tolyl mercaptoacetate; the reaction product of 1 mole of butyl stannoic acid with 2 moles of p-butylphenyl mercaptoacetate; the reaction product of 1 mole of butyl stannoic acid with 2 moles of 2-ethylhexyl mercaptoacetate; the reaction product of 1 mole of butyl stannoic acid with 2 moles of butyl β-mercaptopropionate; the reaction product of 1 mole of butyl stannoic acid with 2 moles of phenyl β-mercaptopropionate; the reaction product of 1 mole of butyl stannoic acid with 2 moles of allyl β-mercaptopropionate; the reaction product of 1 mole of butyl stannoic acid with 2 moles of dodecyl β-mercaptopropionate; the reaction product of 1 mole of butyl stannoic acid with 2 moles of benzyl β-mercaptopropionate; the reaction product of 1 mole of butyl stannoic acid with 2 moles of octyl gamma mercaptobutyrate; the reaction product of 1 mole of methyl stannoic acid with 2 moles of isooctyl mercaptoacetate; the reaction product of 1 mole of methyl stannoic acid with 2 moles of octyl β-mercaptopropionate; the reaction product of 1 mole of octyl stannoic acid with 2 moles of isooctyl mercaptoacetate; the reaction product of 1 mole of octyl stannoic acid with 2 moles of isooctyl β-mercaptopropionate; the reaction product of 1 mole of octyl stannoic acid with 2 moles of methyl mercaptoacetate; the reaction product of 1 mole of octyl stannoic acid with 2 moles of isodecyl mercaptoacetate; the reaction product of 1 mole of octyl stannoic acid with 2 moles of benzyl β-mercaptopropionate; the reaction product of 1 mole of octyl stannoic acid with 2 moles of phenyl mercaptoacetate; the reaction product of 1 mole of octyl stannoic acid with 2 moles of cyclohexyl β-mercaptopropionate; the reaction product of 1 mole of octyl stannoic acid with 2 moles of oleyl mercaptoacetate; the reaction product of 1 mole of isobutyl stannoic acid with 2 moles of propyl mercaptoacetate; the reaction product of 1 mole of isobutyl stannoic acid with 2 moles of amyl β-mercaptopropionate; the reaction product of 1 mole of 2-ethylhexyl stannoic acid with 2 moles of heptyl mercaptoacetate; the reaction product of 1 mole of 2-ethylhexyl stannoic acid with 2 moles of p-tolyl β-mercaptopropionate; the reaction product of 1 mole of allyl stannoic acid with 2 moles of isooctyl mercaptoacetate; the reaction product of 1 mole of oleyl stannoic acid with 2 moles of propyl β-mercaptopropionate; the reaction product of 1 mole of cyclohexyl stannoic acid with 2 moles of nonyl mercaptoacetate; the reaction product of 1 mole of cyclohexyl stannoic acid with 2 moles of isooctyl β-mercaptopropionate; the reaction product of 1 mole of phenyl stannoic acid with 2 moles of butyl mercaptoacetate; the reaction product of 1 mole of phenyl stannoic acid with 2 moles of decyl β-mercaptoacetate; the reaction product of 1 mole of phenyl stannoic acid with 2 moles of phenyl mercaptoacetate; the reaction product of 1 mole of benzyl stannoic acid with 2 moles of hexyl mercaptoacetate; the reaction product of 1 mole of octadecyl stannoic acid with 2 moles of ethyl mercaptoacetate; the reaction product of 1 mole of butyl stannoic acid with 2 moles of monooctyl oxalate; the reaction product of 1 mole of butyl stannoic acid with 2 moles of mono butyl malonate; the reaction product of 1 mole of butyl stannoic acid with 2 moles of mono methyl succinate; the reaction product of 1 mole of butyl stannoic acid with 2 moles of mono butyl maleate; the reaction product of 1 mole of butyl stannoic acid with 2 moles of mono ethyl fumarate; the reaction product of 1 mole of butyl stannoic acid with 2 moles of mono butyl glutarate; the reaction product of 1 mole of butyl stannoic acid with 2 moles of mono propyl adipate; the reaction product of 1 mole of butyl stannoic acid with 2 moles of mono isooctyl succinate; the reaction product of 1 mole of butyl stannoic acid with 2 moles of mono methyl sebacate; the reaction product of 1 mole of butyl stannoic acid with 2 moles of mono phenyl succinate; the reaction product of 1 mole of butyl stannoic acid with 2 moles of mono benzyl malonate; the reaction product of 1 mole of butyl stannoic acid with 2 moles of mono cyclohexyl adipate; the reaction product of 1 mole of butyl stannoic acid with 2 moles of mono octadecyl azelate; the reaction product of 1 mole of butyl stannoic acid with 2 moles of mono allyl succinate; the reaction product of 1 mole of butyl stannoic acid with 2 moles of mono oleyl glutarate; the reaction product of 1 mole of methyl stannoic acid with 2 moles of mono octyl oxalate; the reaction product of 1 mole of methyl stannoic acid with 2 moles of mono butyl malonate; the reaction product of 1 mole of methyl stannoic acid with 2 moles of mono methyl succinate; the reaction product of 1 mole of methyl stannoic acid with 2 moles of mono ethyl maleate; the reaction product of 1 mole of methyl stannoic acid with 2 moles of mono isooctyl adipate; the reaction product of 1 mole of octyl stannoic acid with 2 moles of mono amyl oxalate; the reaction product of 1 mole of octyl stannoic acid with 2 moles of mono hexyl malonate; the reaction product of 1 mole of octyl stannoic acid with 2 moles of mono butyl succinate; the reaction product of 1 mole of octyl stannoic acid with 2 moles of mono octyl maleate; the reaction product of 1 mole of octyl stannoic acid with 2 moles of mono isobutyl fumarate; the reaction product of 1 mole of octyl stannoic acid with 2 moles of mono phenyl adipate; the reaction product of 1 mole of octyl stannoic acid with 2 moles of mono cyclohexyl sebacate; the reaction product of 1 mole of isobutyl stannoic acid with 2 moles of mono heptyl succinate; the reaction product of 1 mole of benzyl stannoic acid with 2 moles of mono benzyl pimelate; the reaction product of 1 mole of 2-ethylhexyl stannoic acid with 2 moles of mono butyl malonate; the reaction product of 1 mole of 2-ethylhexyl stannoic acid with 2 moles of mono p-tolyl succinate; the reaction product of 1 mole of oleyl stannoic acid with 2 moles of mono hexyl adipate; the reaction product of 1 mole of cyclohexyl stannoic acid with 2 moles of mono amyl adipate; the reaction product of 1 mole of cyclohexyl stannoic acid with 2 moles of mono methyl succinate; the reaction product of 1 mole of cyclohexyl stannoic acid with 2 moles of mono phenyl glutarate; the reaction product of 1 mole of phenyl stannoic acid with 2 moles of mono phenyl malonate; the reaction product of 1 mole of phenyl stannoic acid with 2 moles of mono ethyl fumarate; the reaction product of 1 mole of phenyl stannoic acid with 2 moles of mono butyl maleate; the reaction product of 1 mole of phenyl stannoic acid with 2 moles of mono octyl succinate; the reaction product of 1 mole of benzyl stannoic acid with 2 moles of mono butyl succinate; the reaction product of 1 mole of octadecyl stannoic acid with 2 moles of mono octyl malonate; the reaction product of 1 mole of butyl stannoic acid with 2 moles of acetic acid; the reaction product of 1 mole of butyl stannoic acid with 2 moles of propionic acid; the reaction product of 1 mole of butyl stannoic acid with 2 moles of formic acid; the reaction product of 1 mole of butyl stannoic acid with 2 moles of butyric acid; the reaction product of 1 mole of butyl stannoic acid with 2 moles of valeric acid; the reaction product of 1 mole of butyl stannoic acid with 2 moles of decanoic acid; the reaction product of 1 mole of butyl stannoic acid with 2 moles of cyclohaxanoic acid; the reaction of 1 mole of butyl stannoic acid with 2 moles of stearic cid; the reaction product of 1 mole of butyl stannoic acid with 2 moles of oleic acid; the reaction product of 1 mole of butyl stannoic acid with 2 moles of arcylic acid; the reaction product of 1 mole of butyl stannoic acid with 2 moles of benzoic acid; the reaction product of 1 mole of butyl stannoic acid with 2 moles of o-toluic acid; the reaction product of 1 mole of butyl stannoic acid with 2 moles of p-toluic acid; the reaction product of 1 mole of butyl stannoic acid with 2 moles of m-toluic acid; the reaction product of 1 mole of butyl stannoic acid with 2 moles of cyclohexanoic acid; the reaction product of 1 mole of methyl stannoic acid with 2 moles of acetic acid; the reaction product of 1 mole of methyl stannoic acid with 2 moles of valeric acid; the reaction product of 1 mole of methyl stannoic acid with 2 moles of benzoic acid; the reaction product of 1 mole of octyl stannoic acid with 2 moles of acetic acid; the reaction product of 1 mole of octyl stannoic acid with 2 moles of propionic acid; the reaction product of 1 mole of octyl stannoic acid with 2 moles of stearic acid; the reaction product of 1 mole of octyl stannoic acid with 2 moles of benzoic acid; the reaction product of 1 mole of phenyl stannoic acid with 2 moles of benzoic acid; the reaction product of 1 mole of phenyl stannoic acid with 2 moles of acetic acid; and the reaction product of 1 mole of phenyl stannoic acid with 2 moles of butyric acid.

In addition to the compounds set forth above there can also be employed as stabilizers for halogen containing resins compounds prepared by reacting a hydrocarbyl stannoic acid with an equimolar amount of a hydrocarbyl mono carboxylic acid and a removal of water as previously set forth. Thus there can be used such condensation products of butyl stannoic acid with either acetic acid, or propionic acid, or butyric acid, or valeric acid, or decanoic acid, or palmitic acid, or stearic acid, or oleic acid, or formic acid, or acrylic acid, or benzoic acid, or o-toluic acid, or p-toluic acid, or m-toluic acid, or cyclohexane carboxylic acid; the condensation products of methyl stannoic acid with either acetic acid or valeric acid or benzoic acid; the condensation products of octyl stannoic acid with either acetic acid, or propionic acid, or butyric acid, or stearic acid, or formic acid, or benzoic acid; the condensation products of phenyl stannoic acid with either acetic acid, or propionic acid, or palmitic acid or benzoic acid.

Surprisingly the tin containing mercaptopropionates are considerably superior to the corresponding tin containing mercaptoacetates as stabilizers. This has been observed not only in connection with the alkyltin mono(alkyl mercaptopropionates) and alkyltin di(alkyl mercaptopropionates) but has even been observed with the alkyltin tri(alkyl mercaptopropionates).

Thus while the Stefl Patent 2,731,482 shows that 3 moles of 2-ethyl hexyl thioglycolate can be reacted with 1 mole of butyl stannic acid, column 5, lines 38 and 63 and column 6 lines 10–36 to prepare butyltin tris(2-ethylhexyl mercaptoacetate) and that such products are useful as stabilizers for vinyl chloride resins, if 2-ethyl hexyl β-mercaptopropionate is used to prepare the corresponding butyltin tri(2-ethylhexyl β-mercaptopropionate) an even better vinyl chloride resin stabilizer is prepared. Likewise monobutyltin tris(isooctyl β - mercaptopropionate) has been found superior to monobutyltin tris(isooctyl thioglycolate) as a vinyl chloride resin stabilizer. The monobutyltin tris(isooctyl β-mercaptopropionate) was prepared by the Stefl general procedure cited supra. The monobutyltin tris(isooctyl β-mercaptopropionate) was also superior as a vinyl chloride resin stabilizer to dibutyltin bis (isooctyl thioglycolate).

Unless otherwise indicated all parts and percentages are by weight.

The stabilizers of the present invention can be used with halogen containing vinyl and vinylidene resins in which the halogen is attached directly to the carbon atoms.

Preferably, the resin is a vinyl halide resin, specifically, a vinyl chloride resin. Usually, the vinyl chloride resin is made from monomers consisting of vinyl chloride alone or a mixture of monomers comprising at least 70% vinyl chloride by weight. When vinyl chloride copolymers are stabilized, preferably the copolymer of vinyl chloride with an ethylenically unsaturated compound copolymerizable therewith contains at least 10% of polymerized vinyl chloride.

As the chlorinated resin there can be employed chlorinated polyethylene having 14 to 75%, e.g. 27%, chlorine by weight, polyvinyl chloride, polyvinylidene chloride, polyvinyl bromide, polyvinyl fluoride, copolymers of vinyl chloride with 1 to 90%, preferably, 1 to 30%, of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-1-chloroethylene, acrylonitrile, chloroacrylonitrile, allylidene diacetate and chloroallylidene diacetate. Typical copolymers include vinyl chloride-vinyl acetate (96:4 sold commercially as VYNW), vinyl chloride-vinylacetate (87:13), vinyl chloride-vinyl acetate-maleic anhydride (86:13:1), vinyl chloride-vinylidene chloride (95:5), vinyl chloride-diethyl fumarate (95:5), vinyl chloride-trichloroethylene (95:5), vinyl chloride-2-ethylhexyl acrylate (80:20).

The stabilizers of the present invention can be incorporated with the resin by admixing in an appropriate mill or mixer or by any of the other well-known methods which provide for uniform distribution throughout the resin compositions. Thus, mixing can be accomplished by milling on rolls at 100–160° C.

In addition to the novel stabilizers there can also be incorporated with the resin conventional additives such as plasticizers, pigments, fillers, dyes, ultraviolet light absorbing agents, densifying agents and the like.

If a plasticizer is employed, it is used in conventional amount, e.g. 30 to 150 parts per 100 parts of resin. Typical plasticizers are di-2-ethylhexyl phthalate, dibutyl sebacate, dioctyl sebacate, tricresyl phosphate.

The tin containing stabilizers are normally used in an amount of 0.01 to 10% by weight of the resin, more preferably 0.2 to 5% of the tin compound is used by weight of the resin.

There can also be included with the novel stabilizers of the present invention conventional stabilizers and antioxidants to assist in improving the properties of the halogen containing resin. Thus there can be included 0.01–10%, preferably 0.1–5% based on the resin of sulfur containing compounds such as dilauryl-thiodipropionate, distearyl 3,3' - thiodipropionate, dicyclohexyl-3,3'-thiodipropionate, dicetyl - 3,3' - thiodipropionate, dioctyl - 3,3'-thiodipropionate, dibenzyl - 3,3' - thiodipropionate, lauryl myristyl-3,3'-thiodipropionate, diphenyl - 3,3' - thiodipropionate, di-p-methoxyphenyl - 3,3' - thiodipropionate, didecyl - 3,3' - thiodipropionate, dibenzyl-3,3'-thiodipropionate, diethyl-3,3'-thiopropionate, lauryl ester of 3-methylmercaptopropionic acid, lauryl ester of 3-butyl-mercaptopropionic acid, lauryl ester of 3-lauryl mercaptopropionic acid, phenyl ester of 3-octyl mercaptopropionic acid, phenyl ester of 3-phenyl mercaptopropionic acid, lauryl ester of 3-phenyl mercaptopropionic acid, lauryl ester of 3-benzyl mercaptopropionic acid, lauryl ester of 3-(p-methoxy) phenyl mercaptopropionic acid, lauryl ester of 3-cyclohexyl mercaptopropionic acid, lauryl ester of 3-hydroxymethyl mercaptopropionic acid, myristyl ester of 3 - hydroxyethyl mercaptopropionic acid, octyl ester of 3-methoxymethyl mercaptopropionic acid, dilauryl ester of 3-carboxylmethyl mercaptopropionic acid, dilauryl ester of 3-carboxypropyl mercaptopropionic acid, dilauryl-4,7-dithiasebacate, dilauryl-4,7,8,1-tetrathiotetradecandioate, dimyristyl-4,11-dithiatetradecandioate, lauryl-3-benzothiazyl mercaptopropionate. Preferably the esterifying alcohol is an alkanol having 10 to 18 carbon atoms. Other esters of beta thiocarboxylic acids set forth in Gribbins Patent 2,519,744 can also be used.

Other beta thiocarboxylic acids include stearyl (1, 2-dicarboethoxyethylthio) acetate, stearyl (1, 2-dicarbolauryloxyethylthio) acetate or the like. Compounds of this type can be made by addition of alkyl ester of mercaptoacetic acid to a dialkyl ester of maleic acid. Similar beta thiocarboxyl compounds can be used which are made by addition of an RSH compound across the maleic ester double bond and where R is alkyl, aryl, alkylcarboxyalkyl, arylcarboxyalkyl or aralkyl. Examples of such compounds are decylthiodilauryl malate, phenylthiodioctyl malate, cetyl (1, 2-dicarboethoxyethylthio) propionate and benzylthiodimyristyl malate.

Similarly useful beta thiocarboxyl synergistic compounds can be prepared by addition of the RSH compounds as defined above across the double bond of dialkyl itaconates, citraconates, fumarates or trialkyl aconitates, e.g. the addition product of lauryl mercaptan with dibutyl itaconate, the addition product of the stearyl ester of mercaptoacetic acid with dilauryl itaconate, the addition product of butyl mercaptan with dilauryl citraconate, the addition product of lauryl mercaptan with tributyl aconitate, the additional product of the lauryl ester of mercaptopropionic acid with triethyl aconitate, pentaerythritol tetra (mercaptoacetate), pentaerythritol tetra (β-mercaptopropionate), 1,1,1-trimethylolethane tri (mercaptoacetate).

There can also be included 0.1–10%, preferably 0.1–5% by weight of the halogen containing resin of metal salt stabilizers such as Groups I and II metal soaps, e.g. calcium stearate, calcium 2-ethylhexoate, calcium octoate, calcium oleate, calcium ricinoleate, calcium myristate, calcium palmitate, calcium laurate, barium laurate, barium stearate, magnesium stearate, zinc stearate, cadmium laurate, cadmium octoate, cadmium stearate and sodium stearate. Other metal salts can be used as lead stearate, lead silicate, aluminum stearate, etc.

There can also be added phenolic antioxidants in an amount of 0.01–10%, preferably 0.1–5%. Examples of such phenols include 2, 6-di-t-butyl-p-cresol, butylated hydroxyanisole, propyl gallate, 4,4'-thiobis(6-t-butyl-m-cresol), 4,4'-cyclohexylidene diphenol, 2,5-di-t-amyl hydroquinone, 4,4'-butylidene bis(6-t-butyl-m-cresol), hydroquinone monobenzyl ether, 2,2'-methylene-bis(4-methyl-6-t-butyl phenol), 2,6-butyl-4-decyloxy phenol, 2-t-butyl-4-dodecyloxy phenol, 2-t-butyl-4-dodecyloxy phenol, 2-t-butyl-4-octadecyloxy phenol, 4,4'-methylene-bis(2,6-di-t-butyl phenol), p-amino phenol, N-lauryloxy-p-amino phenol, 4,4'-thiobis(3-methyl-6-t-butyl phenol), bis [o-(1,1,3,3-tetramethyl butyl)phenol] sulfide, 4-acetyl-β-resorcylic acid, A stage p-t-butylphenolformaldehyde resin, 4-dodecyloxy-2-hydroxybenzophenone, 3-hydroxy-4-(phenylcarbonyl) phenyl palmitate, n-dodecyl ester of 3-hydroxy-4-(phenyl carbonyl) phenoxyacetic acid, and t-butyl phenol.

The use of epoxy compounds in an amount of 0.01–5% in the polymer compositions is also valuable. Examples of such epoxy compounds include epoxidized soya bean oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrinbis-phenol A resins(epichlorhydrin-diphenylolpropane resins), phenoxy-propylene oxide, butoxy-propylene oxide, epoxidized neopentylene oleate, glycidyl epoxystearate, epoxidized α-olefins, epoxidized glycidyl soyate, dicyclopentadiene, dioxide, epoxidized butyl tollate, styrene oxide, dipentene dioxide, glycidol, vinyl cyclohexene dioxide, glycidyl ether of resorcinol, glycidol ether of hydroquinone, glycidyl ether of 1,5-dihydroxynaphthalene, epoxidized linseed oil fatty acids, allyl glycidyl ether, butyl glycidyl ether, cyclohexane oxide, 4-(2,3-epoxypropoxy) acetophenone, mesityl oxide epoxide, 2-ethyl-3-propyl glycidamide, glycidyl ethers of glycerine, pentaerythritol and sorbitol, and 3,4-epoxycyclohexane-1,1-dimethanol bis-9,10-epoxystearate.

Likewise there can be used organic phosphites in an amount of 0.01 to 10%, preferably 0.1–5% of the halogen containing resins.

The organic phosphites contain one or more, up to a total of three, aryl, alkyl, aralkyl and alkaryl groups, in any combination. The term "trialkylaryl" is inclusive of alkyl, aryl, alkaryl and aralkyl phosphites containing any assortment of alkyl, aryl, alkaryl and aralkyl groups. Exemplary are triphenyl phosphite, tricresyl phosphite, tri(dimethylphenyl) phosphite, tributyl phosphite, trioctyl phosphite, tridecyl phosphite, octyl diphenyl phosphite, dioctyl phenyl phosphite, tri(octylphenyl) phosphite, tri (nonylphenyl) phosphite, tribenzyl phosphite, butyl dicresyl phosphite, octyl di(octylphenyl) phosphite, tri(2-ethyl-hexyl) phosphite, tritolyl phosphite, tri(2-cyclohexylphenyl) phosphite, tri-alpha-naphthyl phosphite, tri(phenylphenyl) phosphite, and tri(2-phenylethyl) phosphite.

Of course there can also be incorporated 0.01–10% of conventional organometallic stabilizers such as the known organotin carboxylates and mercaptides to impart lubricity regulation as well as for improved stabilization. Such materials include butyltin tris dodecyl mercaptide, dibutyltin dilaurate, dibutyltin didodecyl mercaptide, dianyhydro tris dibutylstannane diol, dihydrocarbontin salts of carboxy mercaptals such as those set forth in Hechenbleikner et al. Patent 3,078,290, dibutyltin bis(isooctylthioglycolate), etc. There can be included any of the vinyl chloride resin stabilizers set forth in Salyer Patent 2,985,617.

Likewise there can be included polyol stabilizers for vinyl chloride resins in an amount of 0.01–10%. Thus there can be included glycerol, sorbitol, pentaerythritol and mannitol.

Nitrogen containing stabilizers such as dicyandiamide, melamine, urea, formoguanamine, dimethyl hydantoin, guanidine, thiourea and the like also can be included in amounts of 0.1–10%. There can even be included conventional lubricants for vinyl chloride resins such as low molecular weight polyethylene, i.e. polyethylene wax, fatty acid amides, e.g. lauramide and stearamide, bisamides, e.g. decamethylene, bis amide, and fatty acid esters, e.g. butyl stearate, glyceryl stearate, linseed oil, palm oil, decyl oleate, corn oil, cottonseed oil, hydrogenated cottonseed oil, etc.

The novel tin containing stabilizers of the present invention, e.g. mono butyltin mono isooctyl mercaptopropionate and mono butyltin bis isooctyl mercaptopropionate, are also useful in amounts of 0.01 to 10% to stabilize resinous and rubbery hydrocarbon polymers such as polyethylene, polypropylene, ethylene-propylene copolymer (e.g. 60:40); ethylene-butene-1 copolymer (e.g. 95:5), ethylene-propylene-cyclopentadiene terpolymer (e.g. 80:17:3) and the like.

EXAMPLE 1

1 mole (227 grams) of butyl stannoic acid was dehydrated in 800 grams of benzene by azeotropic distillation. Most of the benzene was distilled off at reduced pressure. There was then added slowly with agitation 452 grams (2.21 moles) of isooctyl mercaptoacetate to the dehydrated butyl stannoic acid at 95° C. The removal of benzene and the water of reaction was continued for three hours at reduced pressure after all the isooctyl mercaptoacetate was added while holding the temperature under 95° C. The product in the reaction flask after filtration was a water-white clear liquid.

EXAMPLE 2

Two moles (565.1 grams) of butyltin trichloride was reacted with 12 moles (480 grams) of 50% sodium hydroxide in 2000 grams of water by addition of the alkali to the solution of butyltin trichloride and water at 50° C., and after filtration, water washing the product to remove sodium chloride, a wet yield of 695 grams (445 grams dry) of butyl stannoic acid was obtained.

There was reacted 695 grams (1.96 moles on a dry basis) of the wet butyl stannoic acid and 428 grams (1.96 moles) of isooctyl β-mercaptopropionate under reduced pressure at 70–125° C. for five hours with agitation. Upon filtration there was obtained the polymeric tin ester as a clear, water-white liquid.

EXAMPLE 3

The procedure of Example 1 was repeated using 2.34 moles of isooctyl β-mercaptopropionate in place of the isooctyl mercaptoacetate to produce the reaction product as a liquid.

EXAMPLE 4

The procedure of Example 2 was repeated replacing the isooctyl mercaptopropionate by 1.96 moles of acetic acid to produce the polymeric condensation product of butyl stannoic acid with acetic acid as an infusible solid.

EXAMPLE 5

The procedure of Example 2 was repeated replacing the isooctyl mercaptopropionate by 1.96 moles of glycolic acid to produce the polymeric condensation product of butyl stannoic acid with glycolic acid as an infusible solid.

EXAMPLE 6

The procedure of Example 2 was repeated replacing the butyl stannoic acid by 1.96 moles of octyl stannoic acid and replacing the isooctyl mercaptopropionate by 1.96 moles of mono butyl maleate to produce the polymeric condensation product of octyl stannoic acid with mono butyl maleate as a liquid.

EXAMPLE 7

The procedure of Example 2 was repeated using as the reactants 1.96 moles of phenyl stannoic acid and 1.96 moles of isooctyl mercaptoacetate to produce the polymeric condensation product of phenyl stannoic acid with isooctyl mercaptoacetate as a liquid.

EXAMPLE 8

The procedure of Example 1 was repeated using 2.34 moles of glycolic acid in place of the isooctyl mercaptoacetate to produce the corresponding reaction product.

EXAMPLE 9

The procedure of Example 1 was repeated using 2.34 moles of mono butyl malonate in place of the isooctyl mercaptoacetate to produce the corresponding reaction product.

The other tin esters set forth previously in this specification can be made in the manner described in Examples 1 and 2 by employing the correct stannoic acid with the appropriate hydrocarboxylic mercaptoalkanoate, hydrocarbyl half ester of an alkane or alkene dioic acid, or hydrocarbyl carboxylic acid and employing the proportions of Example 1 for the corresponding products or the proportions of Example 2 for the polymeric compounds.

EXAMPLE 10

A stabilized composition was prepared by mixing 2 parts of the product prepared in Example 1 with 100 parts of polyvinyl chloride (Geon 101EP).

EXAMPLE 11

A similarly stabilized resin was obtained by mixing 3 parts of the product prepared in Example 3 with 100 parts of polyvinyl chloride (Geon 101EP) and 50 parts of dioctyl phthalate.

EXAMPLE 12

A stabilized polyvinyl chloride composition was obtained by replacing the tin stabilizer employed in Example 10 with 2 parts of the polymeric tin ester prepared in Example 2.

EXAMPLE 13

Stabilized polyvinyl chloride compositions were also obtained by replacing the tin stabilizer employed in Example 10 with (a) 2 parts of the tin ester prepared in Example 3; or (b) 2.5 parts of the polymeric tin ester prepared in Example 4; or (c) 2 parts of the polymeric tin ester prepared in Example 5; or (d) 2 parts of the polymeric tin ester prepared in Example 6; or (e) 3 parts of the polymeric tin ester prepared in Example 7; or of the polymeric tin ester prepared in Example 7; or (f) 2.5 parts of the tin ester prepared in Example 8; or (g) 2 parts of the tin ester prepared in Example 9.

EXAMPLE 14

Compositions were prepared by adding to 100 parts of polyvinyl chloride (Geon 101–EP) and 0.25 part of mineral oil to the following materials:

(a) 1.48 parts of polymeric monobutyltin mono isooctyl β-mercaptopropionate oxide (the compound prepared in Example 2).

(b) 2.0 parts of the compound prepared by reacting one mol of dehydrated butyl stannoic acid with 2.34 mols of isooctyl beta-mercaptopropionate (the compound prepared in Example 3).

(c) 2.6 parts of monobutyltin tris isooctyl β-mercaptopropionate.

(d) 1.17 parts of monobutyltin mono isooctyl thioglycolate.

(e) 1.9 parts of the compound prepared in Example 1.

(f) 2.6 parts of monobutyltin tris isooctyl thioglycolate.

(g) 2.0 parts of dibutyltin bis isooctyl thioglycolate.

The proportions of the different compounds in Example 16(a) through (g) where chosen so as to give equal quantities of tin metal in each case.

All the formulations were then heat aged at 350° F. for times up to 120 minutes (2 hours).

Formulation 16(d) began to darken at 15 minutes and was completely black at 75 minutes. Formulation 16(e) began to darken after 30 minutes and was completely black after 120 minutes. Formulation 16(g) was a medium brown after 120 minutes and the poorest of the remaining samples. Formulation 16(f) was a very light brown after 120 minutes and was the next poorest sample. The best sample was Formulation 16(c) which had barely changed color after 120 minutes. Formulation 16(a) and 16(b) were substantially identical in appearance after 120 minutes and were intermediate between Formulation 16(c) and Formulation 16(f) in appearance.

In place of monobutyltin tris(isooctyl β-mercaptopropionate) as a stabilizer as set forth in Example 16(c) there can be used other monohydrocarbyltin tris(hydrocarbyl β-mercaptopropionate) where the hydrocarbyl groups are alkyl, aryl, or aralkyl such as mono butyltin tris(2-ethylhexyl β-mercaptopropionate), monobutyltin tris(octyl β-mercaptopropionate), monobutyltin tris(butyl β-mercaptopropionate), monobutyltin tris(decyl β-mercaptopropionate), monobutyltin tris(octadecyl β-mercaptopropinate), monobutyltin tris(phenyl β-mercaptopropionate), monobutyltin tris(p-tolyl β-mercaptopropionate), monobutyltin tris(p-butylphenyl β-mercaptopropionate), monobutyltin tris(benzyl β-mercaptopropionate), monobutyltin tris(methyl β-mercaptopropionate), monobutyltin isooctyl bis(decyl β-mercaptopropionate), monooctyltin tris(isooctyl β-mercaptopropionate), monooctyltin tris(dodecyl β-mercaptopropionate), monophenyltin tris(hexyl β-mercaptopropionate), monobenzyltin tris(isodecyl β-mercaptopropionate), monomethyltin tris(dodecyl β-mercaptopropionate), monooctadecyltin tris(ethyl β-mercaptopropionate).

What is claimed is:
1. A halogen containing resin selected from the group consisting of vinyl chloride homopolymers, vinyl chloride copolymers, vinylidene chloride homopolymers, vinylidene chloride copolymers, polyvinyl bromide, polyvinyl fluoride and chlorinated polyethylene containing a stabilizingly effective amount of the condensation product of 1 mol of monohydrocarbyl stannoic acid with (a) 1 or (b) 2 to 2.5 mols of a compound having a formula selected from the group consisting of

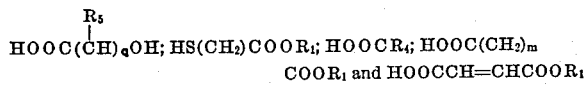

HOOC(ĊH)$_q$OH; HS(CH$_2$)COOR$_1$; HOOCR$_4$; HOOC(CH$_2$)$_m$COOR$_1$ and HOOCCH=CHCOOR$_1$ wherein R$_5$ is hydrogen or methyl, R$_1$ is hydrocarbyl, R$_4$ is hydrogen or hydrocarbyl, $m$ is 0 or a positive integer and $q$ is an integer of at least 1.

2. A composition according to claim 1 wherein the resin is selected from the group consisting of chlorine-containing vinyl and vinylidene resins.

3. A composition according to claim 1 wherein the resin is a vinyl chloride resin.

4. A composition according to claim 1 wherein the halogen containing resin is a vinyl chloride resin and the condensation product is a condensation product of 1 mole of monobutyl stannoic acid with 1 mole of octyl-β-mercaptopropionate.

5. A composition according to claim 4 wherein the octyl group is isooctyl.

6. A member of the group consisting of chlorine containing vinyl and vinylidene resins containing a stabilizingly effective amount of a hydrocarbyltin ester of a hydrocarbyl β-mercaptopropionate selected from the group consisting of (1) the polymeric condensation product of equimolar amounts of a hydrocarbyl stannoic acid and a hydrocarbyl beta-mercaptopropionate and (2) the reaction product of 1 mole of a hydrocarbyl stannoic acid with 2 to 2.5 moles of hydrocarbyl beta-mercaptopropionate.

7. A composition according to claim 6 wherein said tin compound is said reaction product of 1 mole of hydrocarbyl stannoic acid with 2 to 2.5 moles of the mercaptopropionate.

8. A composition according to claim 1 wherein the tin ester is the polymeric condensation product of equimolar amounts of a hydrocarbyl stannoic acid and a hydrocarbyl β-mercaptopropionate.

9. A vinyl chloride resin containing a stabilizingly effective amount of a lower alkyltin ester of an alkyl β-mercaptopropionate selected from the group consisting of the polymeric condensation product of equimolar amounts of a lower alkyl stannoic acid and an alkyl β-mercaptopropionate, and the reaction product of 1 mole of lower alkyl stannoic acid with 2 to 2.5 moles of alkyl beta-mercaptopropionate.

10. A composition according to claim 9 wherein the tin compound is said reaction product of 1 mole of lower alkyl stannoic acid with 2 to 2.5 moles of alkyl beta-mercaptopropionate.

11. A composition according to claim 9 wherein the alkyl stannoic acid is butyl stannoic acid and the alkyl mercaptopropionate is octyl mercaptopropionate.

12. A composition according to claim 11 wherein the octyl group is isooctyl.

13. A composition according to claim 9 wherein the tin ester is the polymeric condensation product of equimolar amounts of a lower alkyl stannoic acid and an alkyl β-mercaptopropionate.

References Cited
UNITED STATES PATENTS

| | | | |
|---|---|---|---|
| 2,731,482 | 1/1956 | Stefl. | |
| 2,789,102 | 4/1957 | Weinberg | 260—45.75 |
| 2,809,956 | 10/1957 | Mack | 260—45.75 |
| 2,985,617 | 5/1961 | Salyer | 260—45.7 |
| 3,015,644 | 1/1962 | Leistner | 260—45.75 |
| 3,063,963 | 11/1962 | Wooten | 260—45.75 |
| 3,255,136 | 6/1966 | Hecker | 260—23 |
| 3,296,289 | 1/1967 | Closkey | 260—45.75 |
| 3,297,629 | 1/1967 | Kauder | 260—429.7 |

DONALD E. CZAJA, *Primary Examiner.*

V. P. HOKE, *Assistant Examiner.*

UNITED STATES PATENT OFFICE
CERTIFICATE OF CORRECTION

Patent No. 3,413,264                                                                 November 26, 1968

Ingenuin Hechenbleikner et al.

It is certified that error appears in the above identified patent and that said Letters Patent are hereby corrected as shown below:

Column 1, line 25, and column 13, line 15, that portion of the formula, each occurrence, reading "$HS-(CH_2)-COOR_1$" should read -- $HS-(CH_2)_q-COOR_1$ --.

Signed and sealed this 17th day of March 1970.

SEAL)
Attest:

Edward M. Fletcher, Jr.                                    WILLIAM E. SCHUYLER, JR.

Attesting Officer                                                         Commissioner of Patents

PO-1050
(5/69)

UNITED STATES PATENT OFFICE
CERTIFICATE OF CORRECTION

Patent No. 3,413,264          Dated November 26, 1968

Inventor(s) Ingenuin Hechenbleikner; Raymond S. Dalter and John F. Hussar

It is certified that error appears in the above-identified patent and that said Letters Patent are hereby corrected as shown below:

In the specification, column 12, lines 41, 45, 48, 50, 52, 53, 54 and 56 all occurrences of "16" should read "14"

SIGNED AND
SEALED
JUL 14 1970

(SEAL)
Attest:

Edward M. Fletcher, Jr.
Attesting Officer

WILLIAM E. SCHUYLER, JR.
Commissioner of Patents